United States Patent

Peterson et al.

[11] Patent Number: 5,851,457
[45] Date of Patent: Dec. 22, 1998

[54] METHOD OF FORMING AN UPHOLSTERED FOAM PLASTIC SEAT CUSHION

[75] Inventors: Gordon J. Peterson, Rockford; Dale M. Groendal, Grand Rapids; Edward H. Punches, Wyoming, all of Mich.

[73] Assignee: Steelcase Inc., Grand Rapids, Mich.

[21] Appl. No.: 669,774

[22] Filed: Jun. 28, 1996

[51] Int. Cl.⁶ .......................... B29C 44/06; B29C 44/12
[52] U.S. Cl. ................. 264/46.5; 264/46.8; 264/102; 264/156
[58] Field of Search ................. 264/46.5, 46.8, 264/257, 156, 102

[56] References Cited

U.S. PATENT DOCUMENTS

| | | |
|---|---|---|
| 3,932,252 | 1/1976 | Woods . |
| 4,025,372 | 5/1977 | Fenton . |
| 4,046,611 | 9/1977 | Sanson . |
| 4,115,170 | 9/1978 | Sanson ................................. 264/46.5 |
| 4,247,347 | 1/1981 | LIscher et al. . |
| 4,247,348 | 1/1981 | Lischer . |
| 4,264,386 | 4/1981 | Sears, Jr. et al. . |
| 4,547,920 | 10/1985 | Hulsebusch et al. . |
| 4,938,912 | 7/1990 | Pelzer ................................. 264/46.8 |
| 4,971,541 | 11/1990 | Onnenberg et al. . |
| 5,017,114 | 5/1991 | Onnenberg et al. . |
| 5,132,063 | 7/1992 | Hughes . |
| 5,232,643 | 8/1993 | Purser . |
| 5,294,386 | 3/1994 | Roth et al. . |
| 5,466,404 | 11/1995 | Kiefer ................................. 264/46.8 |
| 5,468,434 | 11/1995 | Powell et al. . |

FOREIGN PATENT DOCUMENTS

| | | | |
|---|---|---|---|
| 3034973 | 3/1982 | Germany ............................. 264/46.8 |
| 56-111651 | 9/1981 | Japan ................................. 264/46.8 |
| 56-118830 | 9/1981 | Japan ................................. 264/46.5 |
| 58-147325 | 9/1983 | Japan ................................. 264/46.5 |

*Primary Examiner*—Allan R. Kuhns
*Attorney, Agent, or Firm*—Price, Heneveld, Cooper, Dewitt & Litton

[57] ABSTRACT

A method for making upholstered articles comprising a foam core, an integrally attached cover assembly, and an integrally attached scrim is provided. The method includes the step of positioning an air-impermeable cover assembly over a mold cavity of a molding apparatus, applying a vacuum to the fabric through a plurality of apertures in the walls defining the mold cavity to cause the fabric to conform to the shape of the mold cavity, depositing a foam precursor into the mold cavity, positioning an air-impermeable scrim over the foam, and allowing the foam precursor to expand to form the article. The method allows upholstered articles having an integrally attached cover assembly to be manufactured using a pour-in-place process which does not utilize abherents, while still preventing bonding of the foam core to the lid and/or other surfaces of the molding apparatus.

3 Claims, 3 Drawing Sheets

METHOD OF FORMING AN UPHOLSTERED FOAM PLASTIC SEAT CUSHION

FIELD OF THE INVENTION

This invention relates generally to the manufacture of composite articles filled with a cellular foam covered by a fabric, and more particularly to a method of forming an upholstered, cushioned article comprising a flexible foam core and an upholstery cover assembly integrally attached thereto.

BACKGROUND OF THE INVENTION

Upholstered articles such as chair seats and backs, automotive seating, and the like, were traditionally prepared by stitching together a plurality of fabric panels to define a bag-like enclosure into which a molded foam was inserted. This traditional method involves a considerable amount of labor and, as a result, products prepared using such methods are relatively expensive. Consequently, pour-in-place methods have replaced the traditional methods in many cases, particularly in the office furniture and automotive industries.

The pour-in-place method of forming upholstered, cushioned articles is well known and widely practiced. The method generally involves vacuum drawing a fabric into conformity with a female mold cavity, depositing foam precursors into the fabric lined female mold cavity, and allowing the foam precursors to expand and/or react to form a composite article comprising a resilient and flexible foam core having an integrally attached upholstery cover assembly.

The pour-in-place process has many advantages over more traditional methods of forming upholstered articles. First, the step of cutting and securing together a plurality of fabric panels is eliminated, whereby labor costs are substantially reduced. Further, the amount of upholstery fabric can be reduced because unexposed surfaces of the article need not be covered with an upholstery fabric when the pour-in-place process is used. Another advantage with the pour-in-place process is that it allows exact duplication of articles because inaccuracies caused when the panels are sewn together in the traditional process are eliminated. Further, because the upholstery fabric is held in place, i.e. bonded to the foam core, creasing and/or puckering of the upholstery fabric is substantially eliminated. Also, the pour-in-place process results in a more durable article because the upholstery and core are bonded together and act as a unit thereby increasing the life of the cover because it flexes with the foam core.

While the known pour-in-place processes have many advantages over other known processes of forming upholstered articles, there remains some significant problems. While it is not generally specifically disclosed in the prior patents, pour-in-place molding processes generally require the application of abherents or mold release agents on the lid and/or other surfaces of the molding apparatus which come in contact with the poured-in-place foam, to prevent the foam material from sticking to the lid and/or other surfaces of the molding apparatus. The use of abherents or mold release agents has many disadvantages. Typical abherents such as silicones, waxes, polyvinyl alcohols, stearates, are generally applied to the surfaces of the molding apparatus which come in contact with the poured-in-place foam material, by spraying, brushing, etc. On account of the inherent difficulty of accurately applying a spray coating to selected surfaces, sprayed abherents generally contaminate the surrounding atmosphere and accumulate on the floor and other surfaces in the vicinity of the molding apparatus. Such contamination and accumulation is undesirable for a variety of reasons. One of the disadvantages associated with spraying an abherent on mold cavity surfaces is that accumulations of misdirected abherents must be removed frequently to prevent slippery conditions on floors and to reduce the possibility of soiling, staining or otherwise contaminating the upholstery fabric on account of inadvertent contact with surfaces on, or in the vicinity of, the molding apparatus upon which abherent has accumulated. Alternative techniques of applying an abherent to selected surfaces of a mold cavity, such as brushing, are also undesirable because they require more time, whereby production rates are unacceptably reduced. Accordingly, on account of environmental problems, scrap such as that associated with stained fabric, cleaning to remove accumulated abherents from tools, floors and other surfaces, and the labor associated with application of an abherent, it would be highly desirable to eliminated the use of abherents from pour-in-place processes.

In the art of pour-in-place molding, it is generally recognized that it is necessary to crush the poured-in-place foam in order to give the upholstered article the customary and/or desired resilience. To achieve the desired feel and resilience, it is generally recognized that the bubbles or cells in the foam must be broken within a relatively short time after the foam is formed following expansion and/or reaction of the foam precursors, otherwise gases trapped within the foam will contract causing permanent distortion of the shape of the foam which results in reduced resilience, reduced comfort and an unacceptable appearance when the upholstered article is used as a seating component, such as in a chair. It is usually desirable to crush the foam within a few minutes, and more preferably within seconds, after the expansion and/or reaction of the foam precursor has been completed. Specifically, it is generally necessary to crush the foam before the bond between the cover assembly and the poured-in-place foam has reached adequate strength to prevent delamination or debonding between the cover assembly and the poured-in-place foam. Conventional methods of crushing the poured-in-place foam have generally involved mechanically crushing or squeezing the upholstered article or placing the entire article in a vacuum chamber wherein the article is subjected to a vacuum from all sides. With either of these techniques, excessive crumpling or mechanical deformation of the article is caused such that excessive shear forces are applied to the interfacial bond between the poured-in-place foam and the cover, causing delamination or debonding between the upholstery cover assembly and the poured-in-place foam. Accordingly, it would be desirable to provide a method of quickly and easily crushing the poured-in-place foam cushion to break down some of the internal structure thereof, to give the foam core of the article the required resilience, without subjecting the foam core to excessive shear stresses at the interface between the foam core and the cover assembly integrally bonded thereto.

SUMMARY OF THE INVENTION

This invention provides a method of forming an upholstered article using a pour-in-place process which does not require messy and expensive abherents, and which also prevents the poured-in-place foam from adhering to the inside of the lid or other surfaces of the mold cavity which come in contact with the foam. The invention thus overcomes problems associated with conventional pour-in-place methods for forming upholstered articles having an integrally attached upholstery cover assembly. Specifically, by eliminating the need for abherents, the step of applying abherents to the lid and/or other surfaces of the mold cavity is eliminated, problems associated with environmental contamination and obtaining permits are eliminated, product which is scrapped on account of abherent soiling, staining or otherwise contaminating the product is eliminated, and the need for routinely cleaning accumulated abherent from tools, equipment, floors, etc. is eliminated. As a result, the method of this invention reduces manufacturing costs, and provides a cleaner and safer manufacturing environment.

In accordance with the invention, there is provided a process for making upholstered articles utilizing a pour-in-place method involving the steps of positioning an air-impermeable cover assembly over a mold cavity of a molding apparatus, applying a vacuum to the cover through a plurality of apertures in the walls defining the mold cavity to cause the cover assembly to conform to the shape of the mold cavity, depositing a foam precursor into the mold cavity on which the fabric is conformedly positioned, positioning an air-impermeable scrim over the foam precursor, and allowing the foam precursor to expand to form an article having a foam core, an integrally attached cover assembly, and an integrally attached scrim.

In accordance with a further aspect of the invention, an impermeable film layer of the scrim is removed or the scrim is perforated after the upholstered article has been formed, and thereafter a vacuum is applied to the outer surface of the scrim to cause the foam core to be drawn toward the scrim whereby some of the internal structure of the foam core is squashed or squeezed without subjecting the interfacial bond between the cover assembly and the foam core to excessive shear stresses which would cause delamination or debonding between the cover assembly and the foam core. By providing the upholstered article with an impermeable scrim which is subsequently perforated or otherwise rendered air-permeable, and thereafter subjected to a pressure differential, a simple, economical technique for quickly and easily crushing the foam to give it the desired resilience without degrading the bond between the cover assembly and the foam core is provided.

In addition to eliminating the use of abherents, the scrim, which becomes bonded to the foam core as the foam precursor expands and/or reacts in the mold, helps maintain the desired shape of the article. Specifically, the scrim helps prevent the foam core from relaxing, i.e. deforming on account of internal stresses.

A further benefit of the method of this invention is that the scrim helps protect the foam core against degradation on account of abrasion with a rigid substrate, such as a seat shell. In particular, the upholstered article can be secured to a rigid substrate, such as a seat shell, to form a seat member which can be attached to a chair frame. During normal use of the chair, such as when a person sits down, rises, and/or shifts his/her weight on the seat member, shear forces are imposed upon the seat member at the interface between the upholstered article and the rigid substrate. These shear forces tend to cause relative movement, friction, and abrasion between the foam core and the rigid substrate which leads to degradation of the foam if the scrim is not present. By placing a scrim between the foam core and the rigid substrate, abrasion and degradation of the foam core is eliminated because the scrim is considerably smoother (i.e. has a lower coefficient of friction) than the foam.

Another advantage with utilizing a scrim which is subsequently permeated is that it allows air to escape from the upholstered article when forces are applied to the upholstery side of the article. In particular, when the upholstered article of the invention is used as a seat member, the permeated scrim allows air to quickly escape from the upholstered article when a person sits on the seat member. Without permeations, the scrim would serve as an air barrier, which in combination with the air-impermeable cover assembly would cause the upholstered article to behave as a sealed bag of foam which would respond very slowly and feel uncomfortable to a person sitting on such an upholstered article.

DESCRIPTION OF THE PREFERRED EMBODIMENTS

Figure 1:
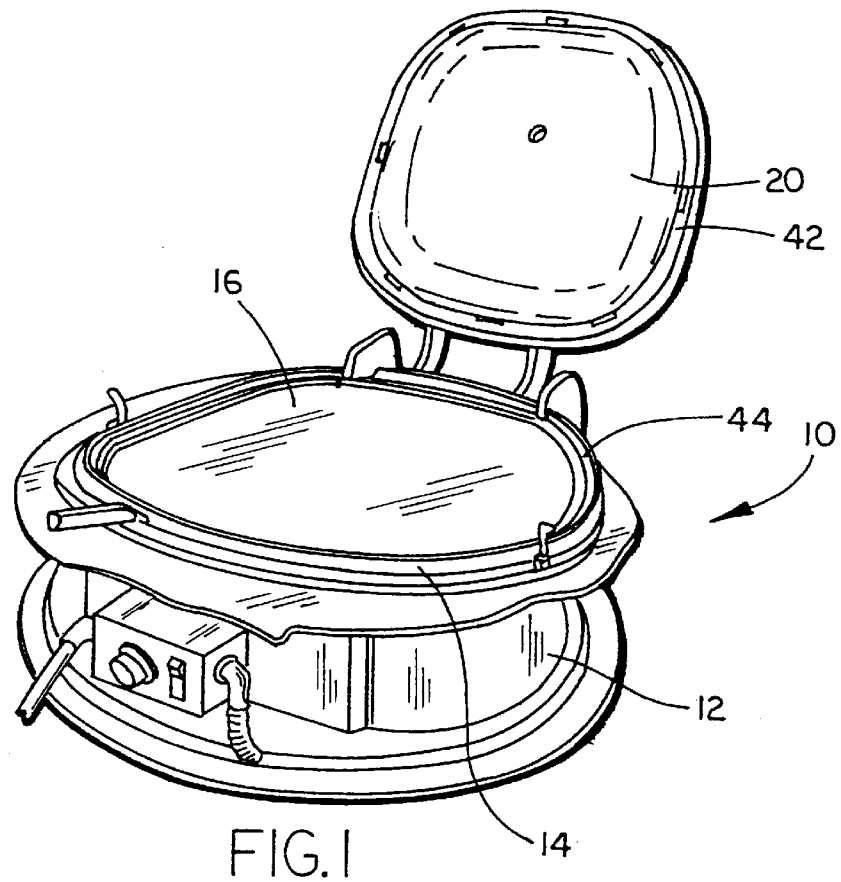
FIG. 1 is a perspective view of a molding apparatus which is suitable for preparing upholstered articles in accordance with the method of the invention.

Shown in FIG. 1 is a molding apparatus 10 which may be employed for preparing upholstered articles using the pour-in-place method of this invention. The molding apparatus includes a lower die 12, which allows an upholstery cover assembly 16 to slip inwardly toward the mold cavity 18 (FIG. 2) of lower die 12 when a vacuum is applied to the inside of the mold cavity, and a lid 20 which is hinged to the lower die 12 for rotation between an opened position as shown in FIG. 1 and a closed position wherein lower die 12 and lid 20 define an enclosed mold cavity. Clamping ring 14 fits around the upper peripheral edge of mold cavity 18 with the cover assembly 16 being clamped between lower die 12 and clamping ring 14 in a substantially flat condition as shown in FIG. 1. A plurality of clamps mounted on the upper side of the lower die 12 outwardly from the perimeter of the mold cavity are used for securing clamping ring 14 to lower die 12 with cover assembly 16 disposed therebetween. The clamping ring 14 and clamps 22 are configured and adjusted to allow the cover assembly to slip downwardly into the mold cavity when a vacuum is applied to the inside of the mold cavity. Slip clamps are well known to the art and are described, for example, in U.S. Pat. No. 3,943,215.

Figure 2:
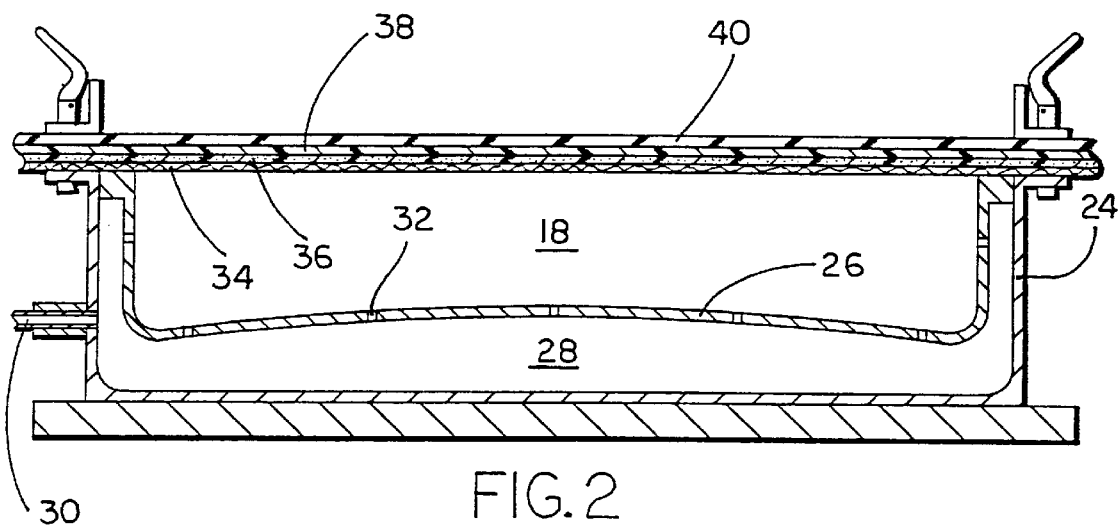
FIG. 2 is a transverse cross-sectional view of the molding apparatus shown in FIG. 1.

With reference to FIG. 2, lower die 12 includes an outer box 24 and a mold wall 26 disposed inwardly of outer box 24. A vacuum chamber 28 is defined by the spaced outer box 24 and mold wall 26. A port or passageway 30 provides communication between vacuum chamber 28 and a vacuum pump (not shown). Port 30 may also be selectively in communication with a compressed air source (not shown) by way of valve means (not shown) to allow compressed air into the chamber 28 to assist in the removal of a finished upholstered article. Mold wall 26 includes a plurality of apertures 32 which allow a vacuum to be drawn on mold cavity 18 when a vacuum is applied to vacuum chamber 28.

The cover assembly 16 may generally be any suitable air-impermeable assembly which can be drawn into conformity with the mold walls 26 defining mold cavity 18. Cover 16 need only be sufficiently air-impermeable to allow the cover to be drawn into conformity with the mold cavity when a pressure differential is applied across the fabric. Cover 16 must also exhibit sufficient flexibility and stretchability to permit drawing of the fabric into close conformity with the walls of the mold cavity. Suitable cover assemblies are well known to the art and include covers having a woven or knitted outer upholstery layer, or a flexible vinyl or leather material may also be suitable. The cover assembly should also be impermeable to the foam precursors used to form the core of the upholstered article.

In the illustrated embodiment, the cover assembly 16 is a laminate having an outer upholstery layer 34 which constitutes an exposed outer covering or face for at least a portion of the upholstered article, a relatively thin foam layer or topper 36, an inner air-impermeable barrier layer 38, and a primer coating layer 40. Laminate cover assembly 16 can be formed using well known techniques, such as passing the layers through a hot roller with a thin film of hot melt adhesive disposed between each of the adjacent layers 34, 36 and 38. Upholstery layer 34 can be generally any suitable upholstery fabric including woven or knitted cloth, vinyl, or leather. The foam layer 36 is preferably a breathable, relatively low density, resilient foam which provides a certain degree of breathability for the upholstery covering and which enhances the comfort of seat and back cushions prepared in accordance with the method of the invention. The foam layer 36 is preferably an open celled polyurethane foam having a density of from about 20 to about 40 kilograms per cubic meter, more preferably from about 20 to 25 kilograms per cubic meter, with a presently preferred material having a density of about 23 kilograms per cubic meter (i.e. about 1.45 pounds per cubic foot). Foam layer 36 is preferably relatively resilient, for example, having a 45 Index resilience (V 45). The thickness of the foam layer 36 is not particularly critical, but is generally in the range from about 0.10 inches to about 0.5 inches, with a suitable thickness being, for example, 0.17 inches. The density of the topper 36 is preferably less than that of the foam core. Other breathable or air-impermeable foam materials having a suitable density and resilience may also be used for layer 36. Other suitable materials include polypropylene, polyethylene, polyether, polyester, etc. The air-impermeable layer is preferably a closed cell foam, such as a polyvinyl chloride closed cell foam. Other air-impermeable barriers can be used, although closed cell foams are preferred. The thickness of the air-impermeable barrier layer 38 is not particularly critical, although thicknesses from about 0.10 inches to about 0.20 inches are preferred, with a suitable thickness being, for example, about 0.06 inches.

It is generally been found advantages to apply an insulating primer layer 40 to the air-impermeable barrier when the air-impermeable barrier is comprised of a polyvinyl chloride and the core is comprised of a urethane foam, to prevent violent reaction between the urethane foam precursors and the polyvinyl chloride plasticizers in barrier layer 38. A suitable insulating primer layer for isolating the polyvinyl chloride from the polyurethane foam precursor to prevent reaction therebetween is a water-based polyurethane primer coating. The primer coating 40 can be applied by any suitable means such as spraying, transfer roll coating such as grevier coating, brushing, etc. The primer coating 40 can be applied to a thickness of from about 0.5 mils to about 1.5 mils, but is preferably applied to a thickness of under 1 mil.

Figure 3:
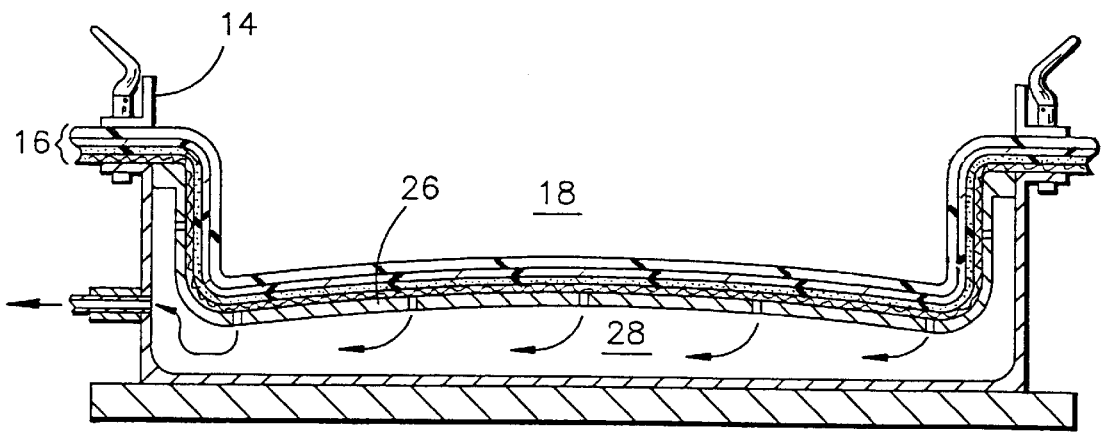
FIG. 3 is a transverse cross-sectional view of the molding apparatus with a composite laminate air-impermeable cover assembly drawn in conformity with the walls defining the mold cavity of the molding apparatus.

After the cover assembly 16 has been positioned over the mold cavity 18 and clamping ring 14 has been clamped in place as shown in FIG. 2, a vacuum is applied to chamber 28 to cause the fabric 16 to be drawn into the mold cavity 18 into conformity with mold walls 26 as shown in FIG. 3. Thereafter, a foam precursor is deposited on to the backside of the fabric 16 which is positioned in conformity with the mold cavity. The amount of foam precursor which is deposited into the mold cavity on top of the backside of fabric 16, is that amount which will expand and/or react to fill the enclosed mold cavity defined by mold wall 26 and lid 20. The appropriate amount of foam precursor needed can be readily determined by those having ordinary skill in the art.

Figure 4:
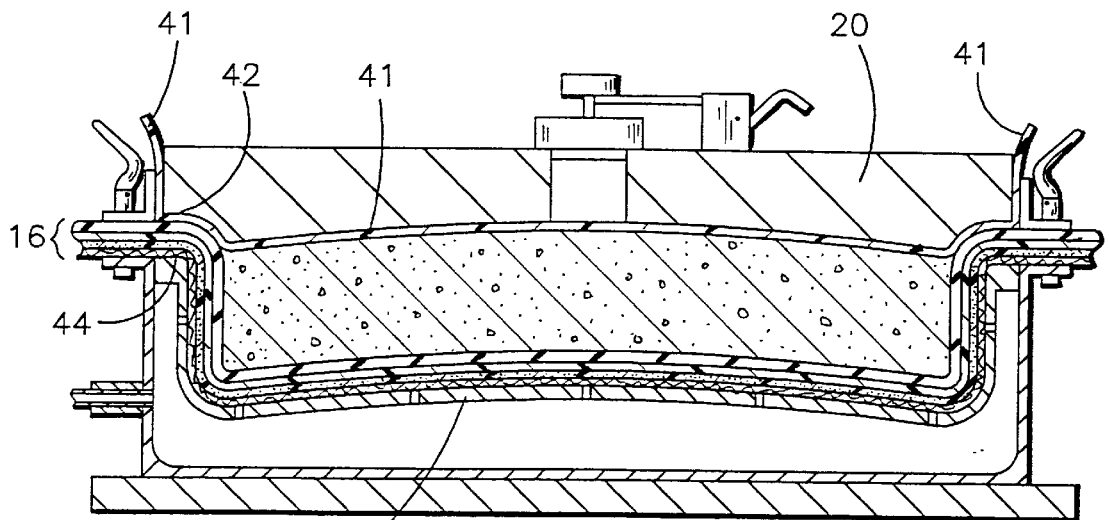
FIG. 4 is transverse cross-sectional view of the molding apparatus after a foam precursor has been deposited within the mold cavity and allowed to expand to fill the volume of the molding apparatus.

After the appropriate amount of foam precursor has been deposited in the cavity on top of the backside of fabric 16, a scrim is positioned over the foam precursor, and lid 20 is rotated to the closed position with the edges 42 of lid 20 seating against a inner peripheral seat 44 on the top side of clamping ring 14, preferably with the edges of the scrim 41 disposed between the edges 42 of lid 20 and seat edge of clamping ring 14. The foam precursor is allowed to expand and/or react to fill the volume of the mold cavity 18 as shown in FIG. 4.

Scrim 41 is a relatively thin air-impermeable material, preferably comprising a woven or non-woven fiber layer laminated to a continuous synthetic resin film. The woven or non-woven layer is preferably comprised of synthetic polymeric fibers. Suitable polymeric fibers include polyolefin fibers such as polypropylene fibers, polyester fibers or polyethylene fibers. The continuous polymeric film layer is preferably a polyolefin film such as a polyethylene or polypropylene film. A preferred scrim comprises polypropylene fibers arranged in a non-woven matt and a film which consists essentially of polyethylene laminated thereto. The thickness of the scrim is not particularly critical. However, the thickness of the continuous polymeric film layer must be sufficient to maintain a barrier which will prevent the foam precursor from penetrating through to the lid 20. While the woven or non-woven fiber layer of the scrim is not essential, such layer is desirable to enhance bonding between the foam core 46 and scrim 41. Accordingly, when a two-layer scrim comprising a woven or non-woven fabric layer and a film layer is used, the scrim is placed over the foam precursor in the mold cavity with the film side facing upwardly and with the woven or non-woven fabric side facing downwardly toward the foam precursor in the mold cavity.

The foam precursor used to form core 46 is preferably a polyurethane precursor, although polypropylene, polyethylene, polyether and other foam precursors may be used if desired. The foam precursors used to form the core 46 are preferably selected to achieve an ultimate density for the expanded foam core of from about 40 to about 60 kilograms per cubic meter.

Figure 7:
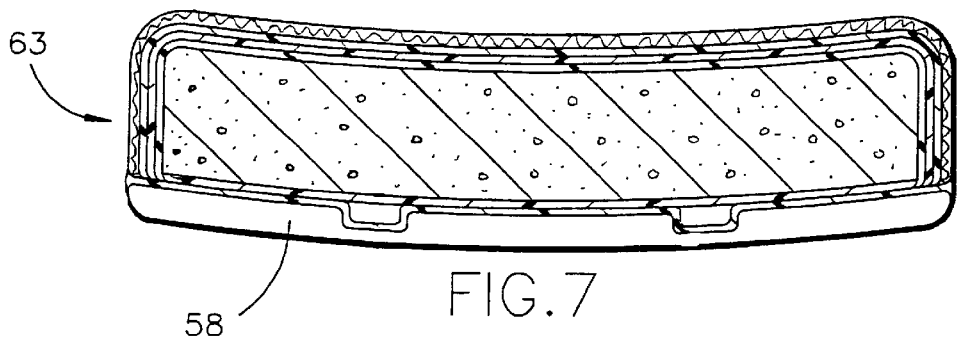
FIG. 7 is a cross-sectional view of a seat member formed by securing an upholstered article to the rigid substrate shown in FIG. 6.

As the foam precursors expand and/or react to fill the mold cavity, the foam core will adhere or bond to the cover assembly 16 and to scrim 41 to form a composite upholstered article comprising a foam core 46 having covering 16 integrally bonded thereto and having scrim 41 also integrally bonded to the core. Preferably, the cover 16 and scrim 41 together form a continuous covering around the core 46 as shown in FIGS. 4 and 7. The foam precursors will generally expand and/or react to fill mold cavity 18 and form core 46 in less than 5 minutes. The appropriate time needed to form core 46 can be easily determined by those having ordinary skill in the art.

Figure 5:
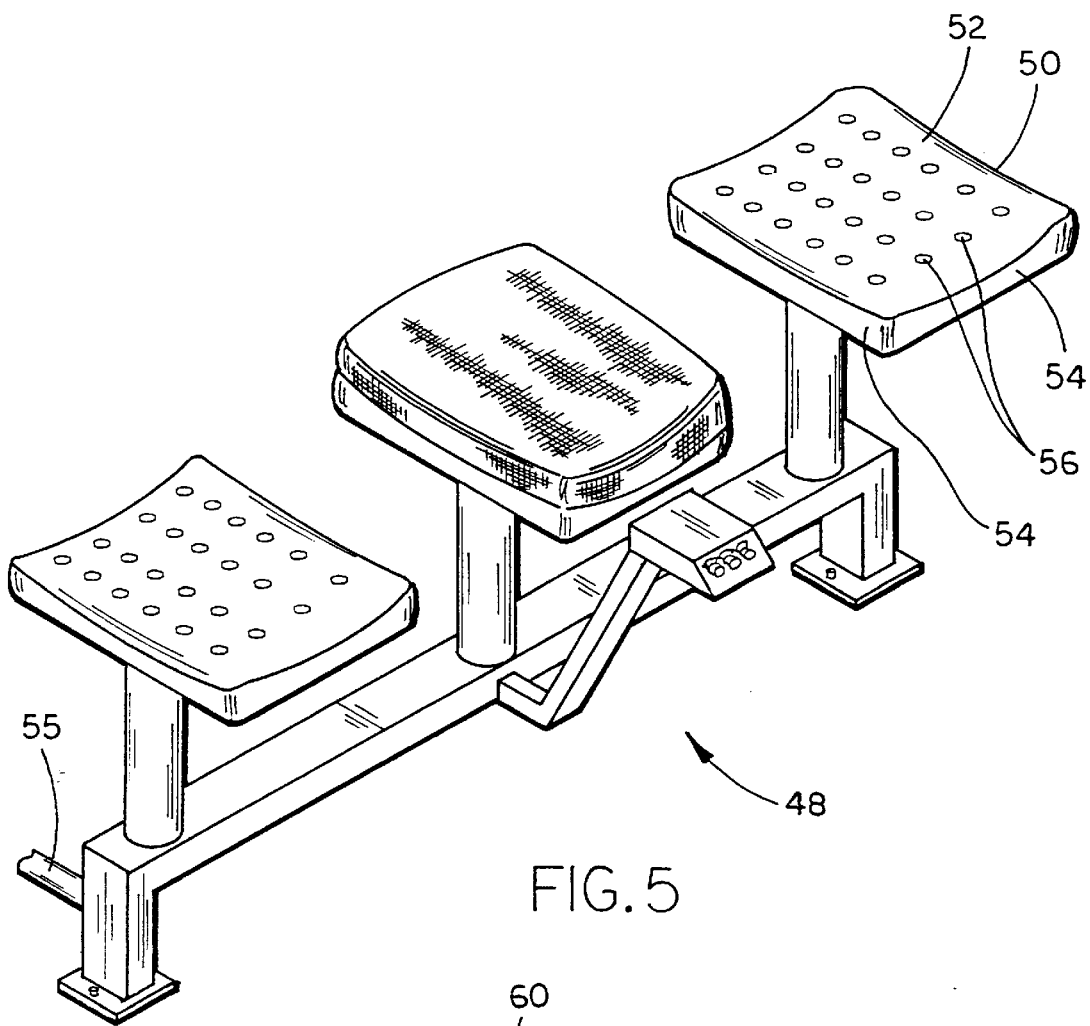
FIG. 5 is a perspective view of a fixture used for applying a pressure differential across a permeated scrim (which covers a portion of the surface of the upholstered article) in order to crush the foam core of the article to provide the upholstered article with a desired resilience.

After the composite article has been formed, lid 20 is rotated to the open position and the upholstered article is removed. Thereafter, it is generally desirable to crush the foam core to impart the desired resilience to the core 46. In accordance with the preferred embodiment, the core 46 is crushed by first perforating scrim 41 or separating the film layer from the scrim, and applying a vacuum to the scrim side of the upholstered article. A suitable apparatus for crushing core 46 is shown in FIG. 5. The apparatus shown in FIG. 5 includes a plurality of fixtures 50 having an upper perforated fixture plate 52, a plurality of side walls 54 and a bottom (not shown), which together define a vacuum chamber in fluid communication with a vacuum hose 55 connected to a vacuum pump (not shown). Plate 52 includes a plurality of apertures 56 in fluid communication with the vacuum chamber of fixture 50. The outer surface of plate 52 generally conforms to the scrim covered side of the upholstered article. After the scrim has been permeated, the upholstered article is placed on the conforming fixture 50 with the scrim side of the upholstered article generally placed in registry with the upper surface of plate 52. A vacuum is then drawn through hose 55 and applied to the scrim side of the upholstered article through apertures 56 to cause the upholstery covering side of the upholstered article and the core 46 to be urged toward the fixture 50, whereby the foam is crushed to improve the resilience of the core 46. Scrim 41 may be permeated by any suitable means, such as by running a roller over the scrim, wherein the roller includes a plurality of pointed, perforating projections which extend radially outwardly from the axis of the roller. A preferred technique for permeating a scrim comprised of a woven or non-woven fabrous layer and a continuous film layer thereto, is to simply remove the film layer, leaving the permeable fibrous layer bonded to the foam.

Figure 6:
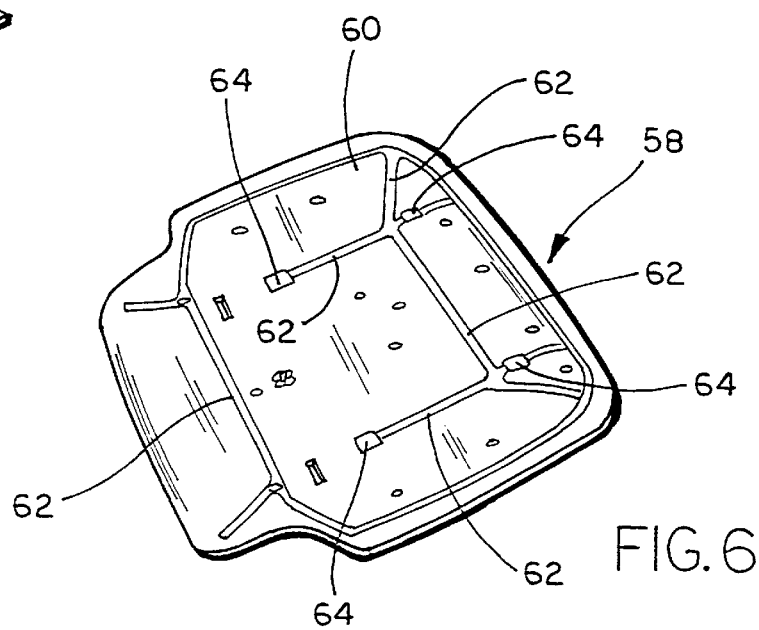
FIG. 6 is a perspective view of a rigid seat shell to which the upholstered article can be secured to form a seat member.

In FIG. 6, there is shown a rigid substrate or seat shell 58 having an upwardly facing surface 60 which generally conforms to the underside (i.e. the scrim side) of the upholstered article. The upper surface 60 of seat shell 58 includes a plurality of channels 62 and openings 64 which allows air to easily escape from a seat member, which is formed by securing the underside of the upholstered article to the conforming surface 60 of shell 58. An upholstered cushion 63 secured to shell 58 to form a finished seat member 64 is shown in FIG. 7.

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A method for making an upholstered article comprising:
    positioning an air-impermeable cover over a mold cavity of a molding apparatus;
    applying a vacuum to the cover through a plurality of apertures in walls defining the mold cavity to cause the cover to conform to the shape of the mold cavity;
    depositing a foam precursor into the mold cavity in which the cover is conformedly positioned;
    positioning an air-impermeable scrim over the foam precursor;
    allowing the foam precursor to expand into the volume of the mold cavity to form an upholstered article having a foam core, an integrally attached cover, and an integrally attached scrim; and
    removing the upholstered article from the mold cavity, permeating the scrim, and applying a vacuum to the scrim side of the upholstered article to crush the foam core.

2. The method of claim 1 further comprising securing the permeated scrim side of the upholstered article to a rigid plastic substrate to form a seat member.

3. The method of claim 2 wherein said rigid plastic substrate includes a plurality of channels formed on a side of the substrate joined to the upholstered article, the channels being in communication with the surrounding atmosphere to allow air to escape easily.

* * * * *

UNITED STATES PATENT AND TRADEMARK OFFICE
CERTIFICATE OF CORRECTION

PATENT NO. : 5,851,457
DATED : DECEMBER 22, 1998
INVENTOR(S) : GORDON J. PETERSON, DALE M. GROENDAL and EDWARD H. PUNCHES It is certified that error appears in the above-identified patent and that said Letters Patent is hereby corrected as shown below:

Column 1, Line 52;
"remains" should be --remain--.

Column 2, Line 18;
"eliminated" should be --eliminate--.

Column 4, Line 21;
Before "transverse" insert --a--.

Column 5, Line 37;
"celled" should be --cell--.

UNITED STATES PATENT AND TRADEMARK OFFICE
CERTIFICATE OF CORRECTION

PATENT NO. : 5,851,457
DATED : December 22, 1998
INVENTOR(S) : Gordon J. Peterson et al.

It is certified that error appears in the above-identified patent and that said Letters Patent is hereby corrected as shown below:

Column 5, Line 60;
"advantages" should be --advantageous--.

Column 6, Line 24;
"a inner" should be --an inner--.

Column 7, Line 37;
"fabrous" should be --fibrous--.

Signed and Sealed this

Twenty-second Day of June, 1999

Q. TODD DICKINSON

*Attest:*

*Attesting Officer*     Acting Commissioner of Patents and Trademarks